Patented June 22, 1943

2,322,735

UNITED STATES PATENT OFFICE 2,322,735

HEMOSTATIC ANALGESIC, AND BACTERICIDAL COMPOSITION OF MATTER

Nicholas M. Molnar, New York, N. Y., assignor to Albert D. Mizzy, New York, N. Y.

No Drawing. Application August 11, 1939, Serial No. 289,591

3 Claims. (Cl. 167—58)

The object of the present invention is to provide a stable hemostatic, analgesic and bactericidal composition of matter which will also possess a tissue-healing characteristic, the compound being particularly adapted for use in oral surgery where areas are generally infected with bacteria including definitely pathogenic organisms.

A hemostatic agent acquires that property either through its ability to promote the formation of fibrin out of fibrinigin, or, upon its property of precipitating the blood proteins. The former is usually an unstable biological preparation. The latter is either a compound which bases its property of precipitation of proteins upon its acidity, such as ferric sulfate, or, bases its property upon the formation of an insoluble protein derivative.

Substances have heretofore been recognized and employed which each accomplish one of the above-mentioned functions, but their separate application has been indicated because of a recognized lack of stability in solution.

By means of the present invention, a composition of matter possessing all of the above-stated functions in solution, in paste form, and also in powder form for completion into the paste form through the use of my prepared liquid later to be described, is provided. The primary constituents of the composition of matter are tannic acid, chlorbutanol and a solvent, and in one phase of the compound the added constituent sulfanilamide the composition of matter having the valuable characteristic that the bacteriastatic and/or bactericidal properties of the combined ingredients are greater than the aggregate of the individual components separately, and the pH is raised.

Ferric sulfate has been commonly used as a hemostatic agent, but it is undesirable because of its strong acidity due to the strong ionization of the sulfate ions. Tannic acid, however, forms an insoluble protein tannate such as is produced when hide is tanned. Tannic acid has the definite advantage over ferric sulfate in being closer to neutrality and possessing a definite tissue-healing characteristic.

I have found that by a special method I can bring sulphanilamide into solution and increase the bactericidal property considerably as expressed in the time required for the bacteria to be killed. Thus, in the combination of tannic acid and sulfanilamide the desired hemostatic tissue-healing and bactericidal functions are obtained, there still remaining bringing into the composition of matter an ingredient which will provide the desired analgesic function. I have found that an operative ingredient for this purpose for this compound is chlorbutanol.

The problems which arise through the combining of these constituents in order that a stable fully operative composition of matter may be provided, are as follows:

Sulfanilamide is insoluble in water, which is the solvent for the tannic acid, but it is soluble in a mixture of alcohol and glycerine. Therefore, I dissolve the sulfanilamide in alcohol and glycerine, which solvents are miscible with tannic acid solutions. The presence of the glycerine enhances the ease with which chlorbutanol goes into solution. Ordinarily, water will take up upon heating at the most $\frac{1}{6}$ of a gram of chlorbutanol per 100 c. c. of water. Not having in my formula sufficient water to bring this much chlorbutanol into solution, I have found it advantageous to utilize the dissolving power of glycerine for chlorbutanol. I have discovered that the alcohol-glycerine solution of chlorbutanol and sulfanilamide are compatible. Further than that, I have discovered that when this solution is mixed with a water solution of tannic acid, a stable solution is obtained which, when subjected to the extreme temperature of boiling and refrigeration in an ice chamber, its stability is not affected. The solution remains stable when kept at body temperature for several weeks, i. e., at approximately 98° F.

As an example, I form a composition of matter comprising the following:

| | |
|---|---|
| Tanic acid | grams__ 26 |
| Chlorbutanol | do____ 0.8 |
| Sulfanilamide | do____ 2 |
| Alcohol (95%) | c.c.__ 35 |
| Glycerine | c.c.__ 10 |
| Water | c.c.__ 60 |

My procedure is as follows:

Mix the alcohol and glycerine together, add the sulfanilamide and heat and stir until dissolved. Add the chlorbutanol and stir until dissolved. Dissolve the tannic acid in the water and mix the two solutions; filter. The volume of this solution is approximately 110 c.c.

While I prefer that the proportions of the various ingredients be substantially as stated in the above example, it is entirely possible to vary the proportions of tannic acid from 10 to 50 grams, reducing or increasing the hemostatic effect as desired; the chlorbutanol from 0.25 gram to 2 grams; the sulfanilamide from approximately 1 to 5 grams; modifying the amount of solvent so as to retain the final volume as above specified for these mixtures at 110 c.c.

If a paste is desired, the alcohol and water are eliminated and the chlorbutanol and sulfanilamide are dissolved in the glycerine and then the tannic acid is rubbed into the solution to form the paste. In such case, the proportion of glycerine is increased over that given in the above example. With the proportion of tannic acid, chlorbutanol and sulfanilamide remaining the same, the glycerine may be increased to 25 c.c.

If the powder is desired, tannic acid and chlorbutanol may be mixed and then made into a paste by the surgeon or dentist when ready for application, by mixing said ingredients and a solution containing 1 to 5 grams of sulfonilamide with 10 to 25 c.c. of glycerine. This process of dissolving the sulfonilamide in the glycerine requires moderate heating at water bath temperature, about 200° F.

By means of the invention, the valuable hemostatic properties of tannic acid are secured with a raising of the pH, with consequent reduction of irritant effect due to acidity. Furthermore, the bactericidal properties of my composition of matter are greater than the aggregate properties of the separate constituents.

A second formula is as follows:

| | | |
|---|---|---|
| Tannic acid | grams | 50 |
| Chlorbutanol | do | 0.5 |
| Water | c.c. | 90 |
| Glycerine | c.c. | 10 |

The procedure is as follows:

Mix the water and glycerine together and heat to 80° C., add the chlorbutanol and stir until dissolved, then add the tannic acid and filter after solution has resulted. The volume is approximately 130 c.c.

It will be seen that this second formula omits the sulfanilamide and alcohol of the preceding example.

Comparative tests were done to determine the respective bactericidal properties of these specific examples. The tests were carried out as follows:

*Staphylococcus aureaus E. coli* were cultured in broth for 18 hours. 0.5 c.c. of this virulent broth of *Staphylococcus aureaus E. coli* were innoculated into 5 c.c. of each of the solutions as above given. 5, 10 and 15 minutes later a loopful of the mixture was withdrawn and subcultured at 37° C. No growth was obtained in 24 to 48 hours on these subcultures when the solution containing the sulfanilamide was used, whereas, a growth was obtained when the solution containing no sulfonilamide was used after 5 and 10 minutes exposure of the bacteria to the solution, but no growth was obtained after 15 minutes exposure, showing that the material without the sulfanilamide exhibits a bactericidal action which is, however, delayed when compared with the solution containing the sulfanilamide. As this material will generally remain in contact with the surface treated for a longer period than 15 minutes, either of these solutions may be used, depending upon the clinical necessity, as where virulent infections are present and exceedingly prompt bactericidal action is desired.

Having described my invention, what I claim and desire to secure by Letters Patent is as follows:

1. A stable hemostatic, analgesic and bactericidal preparation comprising a solution of tannic acid, chlorbutanol, and a solvent for chlorbutanol having the property of lowering the ionization factor of the tannic acid, and comprising glycerine, the preparation being stable under extremes of temperature.

2. A stable hemostatic, analgesic and bactericidal preparation comprising tannic acid, chlorbutanol, a solvent for chlorbutanol having the property of lowering the ionization factor of the tannic acid, and comprising glycerine and alcohol, sulfanilamide, and water, the preparation being stable under extremes of temperature.

3. A hemostatic, analgesic and bactericidal stable compound preparation comprising tannic acid, chlorbutanol, alcohol and glycerine, the preparation being stable under extremes of temperature.

NICHOLAS M. MOLNAR.